No. 817,722. PATENTED APR. 10, 1906.
J. W. LYONS.
SAGGAR FOR BAKING POTTERY.
APPLICATION FILED DEC. 29, 1905.
2 SHEETS—SHEET 1.
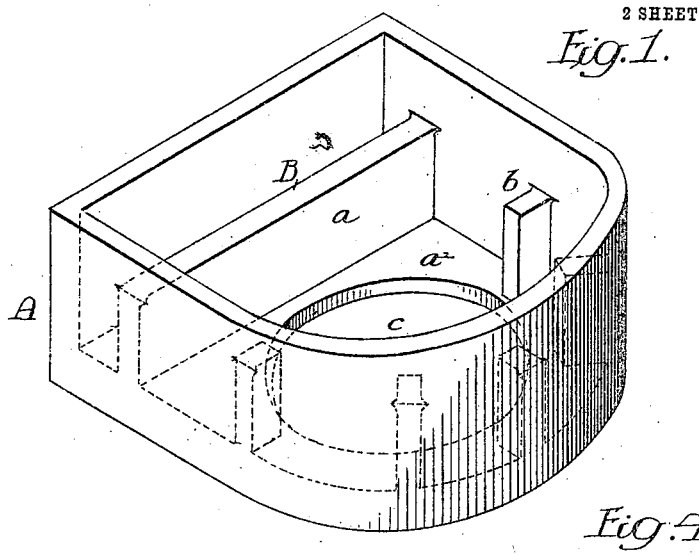
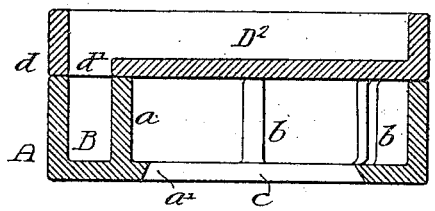
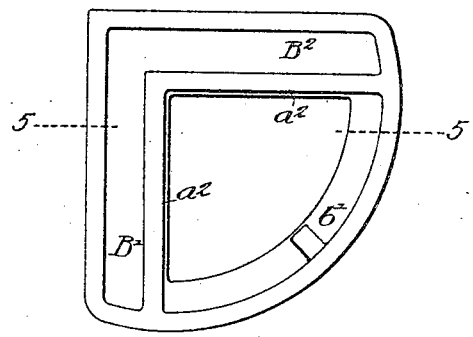
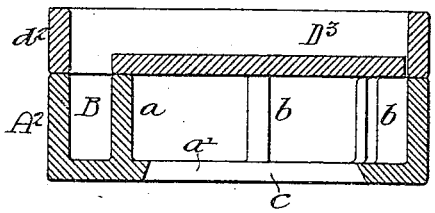
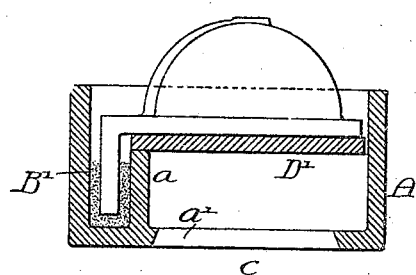
Witnesses:
Willa A. Burrowes
Walter F. Pullinger
Inventor:
John Walter Lyons.
by his Attorneys,
Howson & Howson No. 817,722. PATENTED APR. 10, 1906.
J. W. LYONS.
SAGGAR FOR BAKING POTTERY.
APPLICATION FILED DEC. 29, 1905.
2 SHEETS—SHEET 2.
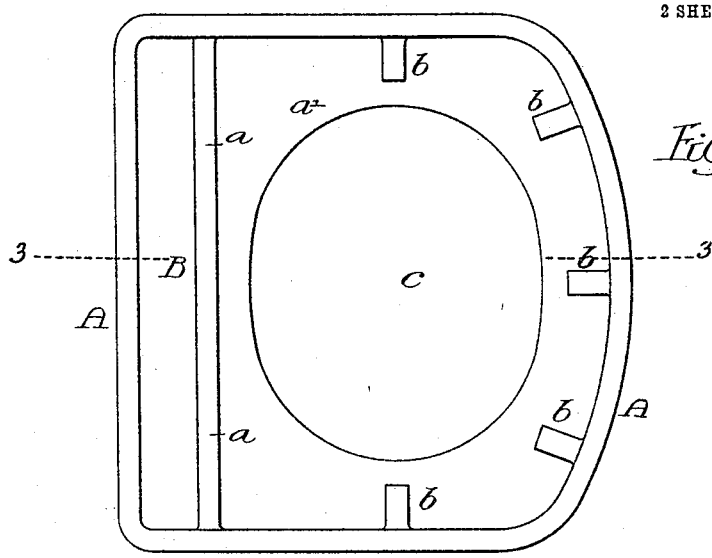
Fig. 2.
Fig. 3.
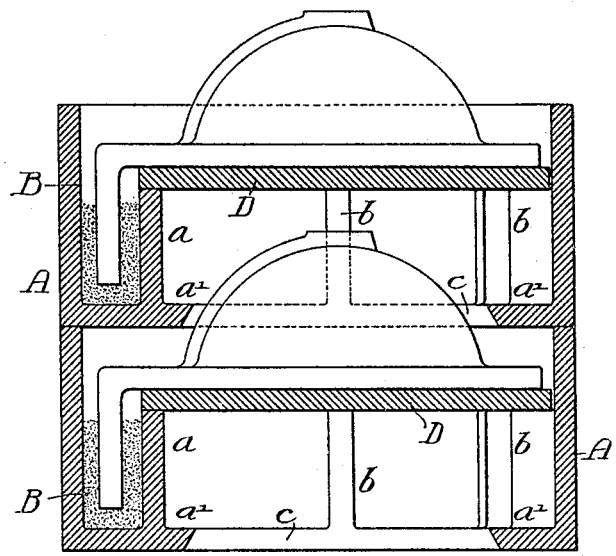
Witnesses:
Willa A. Burrowes
Walter F. Pullinger
Inventor:
John Walter Lyons.
by his Attorneys;
Howson & Howson

UNITED STATES PATENT OFFICE.

JOHN WALTER LYONS, OF PHILADELPHIA, PENNSYLVANIA.

SAGGAR FOR BAKING POTTERY.

No. 817,722.  Specification of Letters Patent.  Patented April 10, 1906.

Application filed December 29, 1905. Serial No. 293,840.

*To all whom it may concern:*

Be it known that I, JOHN WALTER LYONS, a citizen of the United States, residing in Philadelphia, Pennsylvania, have invented certain Improvements in Saggars for Baking Pottery, of which the following is a specification.

My invention relates to certain improvements in saggars in which are placed articles of plastic clay, so that the articles are protected while being baked within a kiln.

The object of my invention is to make a saggar for holding forms, such as washstands, that a greater number of saggars can be piled in a bung than heretofore and in which the backs, as well as the bowls, will be held from warping during the baking process.

In the accompanying drawings, Figure 1 is a perspective view of one of my improved saggars. Fig. 2 is a plan view. Fig. 3 is a vertical sectional view on the line 3 3, Fig. 2, showing two saggars, one mounted upon the other. Fig. 4 is a plan view of a saggar for a corner-washstand. Fig. 5 is a sectional view on the line 5 5, Fig. 4; and Figs. 6 and 7 are views of modified forms.

Potters have been recently making the attempt to produce a washstand of pottery in which the slab, bowl, and back or backs were made in a single piece; but great difficulties were encountered, owing to the fact that the parts would warp and twist or sag during the baking, and, furthermore, the baking was very expensive, owing to the fact that only a limited number could be arranged in a bung, as each individual piece was high, consequently taking up considerable space. By my invention I am enabled to produce perfect work and almost double the capacity of the kiln.

I have illustrated the preferred form of saggar in Figs. 1, 2, and 3.

A is the body of the saggar, made of the usual material.

$a$ is a partition extending across the saggar from one side to the other, forming a pocket B. The bottom $a'$ of the saggar has an opening $c$ therein, through which extends the bowl carried by the under saggars, Fig. 3.

$b$ is a series of projections extending from the three sides of the saggar, and these projections are of the same height as the partition $a$ and support, with the partition, the loose slab D, of the same material as the body portion A.

In Fig. 3 I have shown the washstand-forms mounted in the saggars. Sand is placed in the pocket to about the depth shown, and sand is also sprinkled on the slab, so that the flat surface of the washstand will have a proper seat. The portion of the washstand forming the back enters the pocket B and is embedded in the sand in the pocket. This sand holds the back and prevents it twisting or warping during the baking. The bowl of the washstand projects above the upper edge of the saggar, as shown, and when a second saggar is placed on the first the bowl projects through the opening $c$ in the bottom $a'$ of said saggars, passing the lower edge of the stand in said saggar. Thus a considerable number of stands can be placed in a bung or pile. The washstands are completely protected and properly supported, so that the finished articles are of a high quality.

The saggar shown in Figs. 1, 2, and 3 is designed for a washstand having a flat back, while the saggar shown in Figs. 4 and 5 is for a corner-washstand. This saggar has two pockets B' B², one at right angles to the other and connected at the angle, so as to receive the angular back of the washstand, and only one projection $b'$ is shown to support the slab D', which rests on the projection and the two partitions $a^2$.

In Fig. 6 I have shown the body A' of the saggar cut down to the height of the partition and the slab D² formed with a flange $d$, with an opening $d'$ at one side to allow the back of the stand to enter the pocket.

In Fig. 7 I have shown the flange $d^2$ made separate from both the body A² and the slab D³.

It will be understood that the form of the saggar can be modified to accommodate stands and other objects of different shapes.

In some instances the saggar may be piled upside down when it is desired to dispense with the sand in the pockets.

I claim—

1. A saggar having a body portion, and a pocket, substantially as described.

2. A saggar having a body portion and a partition at one side forming a pocket, substantially as described.

3. A saggar having a body portion and a partition extending from one side of the body portion to the other forming a pocket closed at the bottom, substantially as described.

4. A saggar having a body portion, a bottom and a partition forming a pocket on one side of the partition, the bottom being open on the opposite side of the partition, substantially as described.

5. In a saggar, the combination of a body portion having a partition at one side forming a pocket closed at the bottom, and projections at the opposite side with a slab supported by the partitions and projections.

6. In a saggar, the combination of a body portion, a bottom having an opening therein, a partition at one side of the opening forming a pocket, a series of projections, with a slab mounted on the partitions and projections and less in width than the body portion so that the back of a washstand-form resting on the slab can project into the pocket.

7. In a saggar, the combination, of a body portion, having a bottom, a partition and projections, the side walls of the body portion projecting above the partition and projections, and a slab mounted within the body portion, the side walls being of such height as to support another saggar clear of its contents, substantially as described.

8. In a saggar, the combination, of a body portion having a partition forming, a pocket and sand in said pocket in which the article to be baked is embedded, substantially as described.

9. In a saggar for holding corner-washstand forms, of a body portion having two pockets therein, one at an angle to the other and united at the angle, and having an opening in the bottom to allow the bowl of another washstand-form to project therethrough, substantially as described.

In testimony whereof I have signed my name to this specification in the presence of two subscribing witnesses.

JOHN WALTER LYONS.

Witnesses:
WILL. A. BARR,
JOS. H. KLEIN.